United States Patent [19]

Vrespa

[11] 3,869,557

[45] Mar. 4, 1975

[54] METHOD FOR PRESERVING FRUIT PULPS HAVING A HIGH CONTENTS OF IRON SALTS AND PULPS THUS PRESERVED

[76] Inventor: Bruno Vrespa, via Pisacane 16, Milan, Italy

[22] Filed: Mar. 14, 1974

[21] Appl. No.: 451,151

[52] U.S. Cl................ 426/393, 426/404, 426/414, 426/515, 426/524
[51] Int. Cl............................................. A23b 7/00
[58] Field of Search .......... 426/393, 372, 524, 414, 426/512, 377, 515, 396, 404, 106, 148, 206

[56] References Cited
UNITED STATES PATENTS
2,702,247  2/1955  Northait.............................. 426/399
3,359,122  12/1967  Zebarth ............................. 426/393
3,798,333  3/1974  Cummin ............................. 426/396

Primary Examiner—Samih N. Zaharna
Assistant Examiner—Ernest G. Therkorn

[57] ABSTRACT

A method for preserving banana pulp, wherein the pulp of said fruit is firstly pressed in an atmosphere of an inert gas, preferably helium, and then deep-frozen and packaged in tightly closed, gas-impervious containers.

Such containers are then to be kept at a low temperature, in the way as usually followed for all deep-frozen foods. A few pieces of biscuit may be enclosed within the containers, along with the banana pulp, in order to maintain the good appearance of same pulp.

9 Claims, No Drawings

METHOD FOR PRESERVING FRUIT PULPS HAVING A HIGH CONTENTS OF IRON SALTS AND PULPS THUS PRESERVED

This invention concerns a method for the preservation of pulps of fruits having a high iron-salt content, and in particular of banana pulp, and covers also the thus preserved pulps.

As well known to those skilled in the art, no satisfactory results have been obtained from the many attempts heretofore made for preserving the highly oxidizable fruit pulps, as e.g. banana pulps; the only attempt that may be qualified as rather successful concerns the preservation not of banana pulp, but of so called homogeneized banana latex.

The main purpose of this invention consists in the provision of a method for processing the pulp of fruits in general, and banana pulp in particular, that allows an extended and flawless preservation of said pulp, without oxidation thereof, without addition of chemical additives thereto and such as to ensure the unalterability of the original protein content of the processed pulp.

Another purpose consists in the provision of a method which can be easily and inexpensively carried into practice.

The above and further purposes are attained by a method wherein the fruit pulp is pressed to form blocks, which are then packaged in containers made of a gas-impervious material, whereupon said pulp is deepfrozen at a temperature in the range from ab. $-40°C$. down to $-50°C$., and finally tightly sealed in the same containers, all operations, beginning with the pulp pressing to the sealing of the container, being performed in an atmosphere substantially free from oxygen.

To allow for a better understanding of the mode by which the method according to the invention can be put into practice, and of the particular features of the method, a preferred embodiment thereof will be now described, as a non-restrictive example only.

Let us assume that a banana pulp —i.e. a highly oxidizable pulp— is to be preserved.

Bananas are plucked one month before their complete ripening, and then stored in rooms kept at a constant temperature of ab. $+12°C$., to allow for a gradual and uniform ripening thereof. Otherwise stated, by preventing abrupt temperature changes, bananas having a sufficiently uniform quality are obtained already at the start of their processing.

Since no equipment by which the right banana ripening point can be established is available, the proper banana processing is started slightly before the complete ripening thereof, i.e. when the sugar content amounts to about 80-85 percent, based on the total sugar content of a fully ripened banana.

The bananas are then placed in a room kept at a temperature of ab. $+2°C$. and in an atmosphere free from oxygen, or preferably consisting of an inert gas.

The latter solution is the most practical and economical, and can be practiced by having the machinery as required for putting the instant method into practice, installed inside of a substantially gas impervious structure, e.g. under a transparent plexiglas hood, filled with an inert gas, e.g. helium, at a pressure slightly higher than the atmospheric pressure. By such overpressure, any possibility of oxygen infiltration is positively excluded, i.e. no oxygen pollution occurs either through the hood, or through the outlet wherefrom the processed and packaged pulp is discharged outwardly.

The bananas, once introduced in said hood, are mechanically peeled by already known machines and then conveyed into expressly provided molds, in which they are submitted to a strong pressure, whereby to remove the whole air yet present.

The peeled bananas, before of being pressed, may be possibly minced, to impart to them a creamy consistency, or may be left in their natural shapes.

The pressed pulp cakes are packaged in containers made of nonporous material, whereby to ensure a positive absence of oxygen inside them, after having been sealed.

The subsequent and last step of processing consists in the deep-freezing of the thus packaged product, by means of a deep-freezer, that can be brought into the hood filled with an atmosphere of inert gas, in order to have the containers sealed at the end of deep-freezing the pulp, or the deep-freezing equipment is installed outside of the hood, and in such a case — as can be readily appreciated — the containers filled with the pressed pulp shall be sealed before being submitted to the deep-freezing operation.

The deep-freezing of the fruit pulp should be performed at temperatures in the range from ab. $-40°C$., down to ab. $-50°C$., and preferably at ab. $-45°C$., which is the min. temperature as required to ensure a total absence of microbial activity. The further preservation of the product can be then performed at a temperature of ab. $-30°C$., to ensure the best quality and preservation over a period of time of the processed pulp.

The disclosed method can find application both for packagings as required by the industry, e.g. by the sweet-producing industry, and for packagings designed to be directly merchandized. In the latter case the product, in addition to its good quality, should also be good looking. At this point it is to be remarked that, when the deep-frozen fruit pulp is brought back to room temperature, the 15-20 percent of sugars which were not yet formed due to interruption of banana ripening caused by the deep-freezing, appear in the form of an ugly-looking milky fluid. To prevent such a drawback, a highly hygroscopic biscuit is placed below the cover of the pulp container, directly before it is sealed, whereby to absorb the possibly present amount of milky fluid, which may have a volume of 5 - 6 percent, based on the total contents of the package.

By the way, it may be remarked that a banana flavor is taken-up by the biscuit when imbued with said milky fluid, whereby it can be pleasingly eaten.

Obviously said biscuit, instead of being enclosed as such within the fruit pulp packaging, can be crushed and mixed with the banana pulp, whereby it can perform the same efficient milky fluid absorbing action.

What I claim is:

1. A method for preserving fruit pulps having a high iron salt content, comprising the steps of pressing a fruit pulp in a mold to form a cake, packaging the cake in a container made of a gas-impervious material, deep-freezing the container at a temperature in the range from about $-40°C$. to about $-50°C$. and finally sealing said container, all operations, from pulp pressing to sealing of the container, being performed in an atmosphere substantially free from oxygen so that the iron salts are not oxidized.

2. Fruit pulp preserved by the method of claim 1.

3. A method according to claim 1, wherein all operations, from the pulp pressing to the sealing of the container are performed in an atmosphere of an inert gas.

4. A method according to claim 3, wherein the inert gas is helium.

5. A method according to claim 4, wherein said pressing operation is performed at a temperature of about +2°C.

6. A method according to claim 5, wherein the pulp which is submitted to the pressing operation, is obtained from fruit which is not quite ripe.

7. A method according to claim 6, wherein an edible biscuit is enclosed, along with the fruit pulp, in said container.

8. A method according to claim 7, wherein said pulp is a banana pulp, obtained from bananas containing an amount of sugar equal to about 80–85 percent, based on the total sugar present in a fully ripened banana and wherein said bananas are peeled and pressed under a substantially oxygen-free atmosphere, kept at a temperature of about +2°C.

9. Fruit pulp preserved by the method of claim 7.

* * * * *